United States Patent [19]

Altman

[11] 4,356,157
[45] Oct. 26, 1982

[54] SYNTHESIS OF DAWSONITES

[75] Inventor: Robert L. Altman, Berkeley, Calif.

[73] Assignee: The United States of America as represented by the Administrator of the National Aeronautics and Space Administration, Washington, D.C.

[21] Appl. No.: 178,192

[22] Filed: Aug. 14, 1980

[51] Int. Cl.$^3$ .................. A62D 1/00; C01B 31/24; A61K 33/10
[52] U.S. Cl. .................. 423/419 P; 252/5; 423/600; 424/156
[58] Field of Search .............. 423/419 P, 600, 630; 424/154, 156; 252/5

[56]        References Cited
     U.S. PATENT DOCUMENTS 2,783,124  2/1957  Grote .................. 423/419 P
2,783,179  2/1957  Grote .................. 423/419 P
3,360,345  12/1967 Lewin .................. 424/156
3,557,025  12/1971 Emerson et al. ......... 423/419 P
3,911,090  10/1975 Hem et al. ............. 423/419 P
4,053,579  10/1977 Kato et al. ............ 423/419 P

*Primary Examiner*—Gary P. Straub
*Attorney, Agent, or Firm*—Darrell G. Brekke; John R. Manning

[57]            ABSTRACT

Alkali metal and ammonium dawsonites can be prepared by a non-aqueous process according to which equimolar quantities of the corresponding hydrogen carbonate and aluminum hydroxide in finely divided state are heated together to a temperature within the range of 150° to 250° C. for a period of 1 to 6 hours under a carbon dioxide pressure within the range of 120 to 360 psig. Carbonates may be used instead of hydrogencarbonates.

4 Claims, No Drawings

SYNTHESIS OF DAWSONITES

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention relates to a process for synthesizing sodium, potassium and ammonium dawsonite.

BACKGROUND ART

Dawsonite, sodium aluminum dihydroxide carbonate —$NaAl(OH)_2CO_3$, and its alkali metal analogs are useful compounds that either occur naturally or are synthesized by a variety of processes which take place in aqueous medium. For instance, in the case of potassium dawsonite, the published procedures involve solution methods where the aluminum-containing component is derived from elemental aluminum, aluminum hydroxide, gibbsite, aluminum salts, or aluminum alkoxylates. The patents that have been issued for some of the synthetic processes range from C. Lorwig's German Pat. Nos. 19,784 (1882) and 70,175 (1892) to the Kato et al. U.S. Pat. No. 4,053,579 (1977). Typically, Grote (U.S. Pat. No. 2,783,124) discloses a method of synthesis based on the reaction $Al(OH)_3 + MHCO_3 \rightarrow (HO)_2AlOCO_2M + H_2O$ carried out in aqueous medium with a bicarbonate in which M is the sodium, potassium or ammonium ion. Grote (U.S. Pat. No. 2,783,179) also teaches the preparation of dihydroxy aluminum sodium carbonate by the reaction of an aluminum alkoxide and sodium bicarbonate in aqueous medium. More recently, a dihydroxy aluminum ammonium carbonate has been disclosed in the Kato et al. patent, involving the reaction of ammonium hydrogencarbonate with a soluble aluminum salt. Hern et al. synthesized a compound of the formula $MalOH_2CO_3$, where M is a sodium or potassium ion, by using a silicate anion as a nucleating agent (U.S. Pat. No. 3,911,090).

Finally, Emerson et al. (U.S. Pat. No. 3,557,025) have prepared alkalized alumina composites containing 30 to 80% of a dawsonite—$MAl(OH)_2CO_3$, by heating together a selectively calcined transition alumina, mixing that with 0.5 to 2.5 molar equivalents of $MHCO_3$ and heating that together in the solid state or in aqueous conditions at a temperature of about 100° C. to a temperature below the decomposition point of the dawsonite formed. Pressure is recommended to avoid losses to bicarbonate when the conversion temperature exceeds 100° C. Pressure is obtained by using the bicarbonate as an aqueous suspension and carrying out the reaction in an autoclave.

The dawsonites of the art made by the processes just reviewed have been used in several manners, including as drying agents and polymerization inhibitors for gaseous organic compounds susceptible to polymerization, $SO_2$ absorption, and as stomachal antacids. Yet, although some aluminum compounds have been disclosed to possess fire retardant properties, it has not been possible heretofore to employ dawsonites as fire extinguishers. It must be kept in mind here that fire retardant and fire extinguishing are different processes that have their own individual requirements in order to operate.

The principal object of the present invention therefore is to provide a process to manufacture a type of dawsonite that can be used successfully in fire extinguishing operations, especially in extinguishing fires caused by hot surface ignition of hydrocarbon fuels. Another object is to develop a simple nonaqueous process for the manufacture of dawsonites.

DISCLOSURE OF INVENTION

The objects of the invention have been accomplished by calcining an intimate mixture of highly pulverized hydrogen-carbonate ($MHCO_3$) and aluminum hydroxide at a temperature within the range of 150° to 250° C. for about 1 to 6 hours under a carbon dioxide pressure of 120 to 360 psig. A carbonate ($M_2CO_3$) may be used instead of the hydrogencarbonate. The chemical reactions involved in this process are:

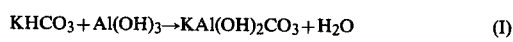

$$KHCO_3 + Al(OH)_3 \rightarrow KAl(OH)_2CO_3 + H_2O \quad (I)$$

or

$$K_2CO_3 + CO_2 + 2Al(OH)_3 \rightarrow 2KAl(OH)_2CO_3 + H_2O \quad (II)$$

In reactions (I) and (II), sodium or ammonium may be substituted for potassium.

DETAILED DESCRIPTION OF THE INVENTION

It is now possible to synthesize dawsonites of high purity by a novel high-temperature, high-pressure, solid-state procedure which involves the following operations and criticalities:

Equimolar quantities of aluminum hydroxide, e.g. gibbsite or bayerite, and an alkali metal or ammonium hydrogencarbonate in the form of a dry, ground powder with a particle size smaller than 90 μm, are intimately mixed and transferred to a cylindrical open-top vessel made of aluminum or other inert metal. The vessel is placed into a high pressure reactor. The reactor is flushed with gaseous carbon dioxide and pressurized with the same gas to a level within the range of 120 to 360 psig. The reactor is then heated as quickly as possible to a temperature within the range of 150° to 250° C., and it is maintained at that temperature for a period of about 1 to 6 hours. When sodium and potassium hydrogencarbonates are used, the calcination is preferably carried out at a temperature within the range of 240° to 250° C. for about 4 to 6 hours under a carbon dioxide pressure of 230 to 250 psig. After cooling and depressurization, the product is dried in a vacuum oven at 50° C.

The above reaction can also take place with carbonates instead of hydrogencarbonates.

The process of the invention will now be illustrated by the following examples which are not intended to limit the scope of the invention as stated in the appended claims.

EXAMPLE 1

Aluminum hydroxide and potassium hydrogen carbonate in equimolar weight ratio (78.00:100.12) were ballmilled together and passed through an ASTM #35 sieve. The aluminum hydroxide used was equivalent to Kaiser Chemical's H-36 grade of alumina trihydrate. It had a particle size finer than 35 mesh and a purity of approximately 99%. The potassium hydrogen carbonate had a purity of 99.7% to 100.3%. It was thoroughly dried and ground to a particle size small enough to pass a 35 mesh sieve. It was kept dry until use and redried if necessary, since calcination reaction weight loss provides a convenient measure of reaction extent.

The intimately mixed materials were then placed in an open-top aluminum cylinder which, in turn, was placed in a Parr Corporation pressure reaction vessel. The sealed pressure vessel was flushed with carbon dioxide to remove most of the air from it and was then charged with carbon dioxide to a pressure of 240 psig. The pressurized assembly was heated quickly to 245° C., in approximately 60 minutes, without allowing any overshoot in the temperature. That temperature was maintained for about 5 hours. The reactor assembly was allowed to cool towards room temperature, while being kept pressurized until a temperature of 50° C. was reached. At that point, the pressure was released and the product removed from the reactor and dried in the aluminum cylinder in vacuo (<0.1 mmHg) at a temperature of 40° to 50° C. for not less than 16 hours. A 96% yield of crude potassium dawsonite was obtained, as calculated from the weight loss accompanying the calcination reaction. A chemical analysis yielded the following results:

| $KAl(OH)_2CO_3$: | $K^{++}$ | $Al^{+3}$ | $CO_3^=$ |
|---|---|---|---|
| Calculated: | 24.42% | 16.85% | 37.48% |
| Found: | 24.4 ± 0.5% | 16.97 ± 0.5% | 37.4 ± 0.5% |

This product can then be pulverized by crushing and ball milling to a particle size for the use intended and it can be intimately mixed with 1% by weight of a solid flow agent such as Tullanox 500 ®, a 400-mesh hydrophobic fumed silica powder to improve its flow properties. The resulting product can be stored in a plastic bag inside a sealed metal container until needed since it does not hydrate.

The nature of the product was confirmed by various analytical techniques. Infrared analysis, for instance, produced a spectrum virtually identical with that reported for potassium dawsonite prepared by the solution processes of the art. Thermogravimetric analysis, on the other hand, showed that the product obtained by the calcination process of this invention possesses greater thermal stability prior to the major endotherms and that the transition temperatures attending these decompositions are measurably higher. Some of the evidence obtained from these thermogravimetric studies appears in the following table.

| | Comparative Weight Loss Profiles of Potassium Dawsonite Prepared in Three Different Ways | | |
|---|---|---|---|
| Temp (°C.) | Low Temp (80° C.) Solution Preparation | High Temp (135° C.) Solution Preparation | Calcination (245° C.) Preparation |
| | (Percent Weight Loss at °C.) | | |
| 260 | 6 | 3 | 2 |
| 300 | 10 | 5 | 3 |
| 350 | 23 | 11 | 8 |
| 400 | 31 | 27 | 24 |

The improved heat stability of the calcined product over that of the solution precipitated products is readily apparent from these data.

A solution preparation of sodium dawsonite obtained from Kaiser Chemical was flaky rather than granular in nature and could not be pulverized in a ball mill as could sodium and potassium dawsonite materials prepared by calcination.

EXAMPLE 2

The preparation of Example 1 was repeated but without carbon dioxide. The reaction was carried out in a nitrogen atmosphere. Analysis of the post-reaction mixture showed that dehydration had taken place, forming such compounds as potassium carbonate and boehmite, AlOOH, instead of the desired dawsonite.

EXAMPLE 3

The preparation of Example 1 was repeated once more at 145° C. under a carbon dioxide pressure of 150 psig. The product weight was practically identical with that of the starting materials, indicating no significant reaction.

EXAMPLE 4

Equimolar quantities of boehmite and potassium hydrogencarbonate were calcined in a pressurized carbon dioxide atmosphere, as in Example 1. No significant quantity of potassium dawsonite was obtained, although interestingly, the "combined" empirical formulas $KHCO_3$ and $AlOOH$ add up to the empirical formula for potassium dawsonite, $KAl(OH)_2CO_3$.

Replacing the hydrogencarbonate with potassium carbonate in the above preparation did not result in the production of the dawsonite.

EXAMPLE 5

Equimolar quantities of sodium hydrogencarbonate and gibbsite were calcined as in Example 1, but with the following change in conditions: temperature: 200° C.; carbon dioxide pressure, 200 psig; and heating period, 72 hours. After cooling, depressurization, and vacuum drying, sodium dawsonite was obtained in 66% yield based on initial $Al(OH)_3$. A 50% excess of sodium hydrogencarbonate gave a 77% yield, while a 25% excess gave an 87% under the same conditions.

I claim:

1. A process for the preparation of dawsonites, which comprises (a) intimately mixing approximately equimolar quantities of finely divided aluminum hydroxide $(Al(OH)_3)$ and a finely divided salt selected from the class consisting of hydrogencarbonates and carbonates of sodium, potassium and ammonia; and (b) heating the mixture in an atmosphere of carbon dioxide under pressure and at a temperature and for a period of time sufficient to form dawsonite.

2. The process of claim 1 wherein the finely divided materials have particle sizes no larger than 90 μm.

3. The process of claim 1 wherein the reactants selected are gibbsite and a potassium carbonate and wherein the reaction is carried out at about 240° to 250° C. in a carbon dioxide atmosphere of about 230 to 250 psig for a period of about 4 to 6 hours.

4. The method of claim 1 wherein the pressure is about 120 to 360 psig, the temperature is about 150°-250° C. and the period of heating is about one to six hours.

* * * * *